(12) United States Patent
Hanyu et al.

(10) Patent No.: US 6,545,372 B2
(45) Date of Patent: Apr. 8, 2003

(54) HYBRID MOTOR FOR A VEHICLE

(75) Inventors: Tomoyuki Hanyu, Hitachi (JP);
Masahiko Amano, Hitachiohta (JP);
Toshio Manaka, Hitachinaka (JP);
Taizou Miyazaki, Hitachi (JP); Yasuo Morooka, Hitachi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/947,509

(22) Filed: Sep. 7, 2001

(65) Prior Publication Data

US 2002/0117858 A1 Aug. 29, 2002

(30) Foreign Application Priority Data

Feb. 28, 2001 (JP) ........................................ 2001-054169

(51) Int. Cl.[7] .............................................. H02B 77/00
(52) U.S. Cl. ..................... 290/41; 290/40 C; 290/40 R; 123/90.11
(58) Field of Search ................... 290/40 R, 41, 290/40 A, 40 B, 40 C; 123/198 F, 90.15, 90.11; 318/139

(56) References Cited

U.S. PATENT DOCUMENTS

| 5,896,845 | A | * | 4/1999 | Matsuda et al. | ............. | 123/480 |
|---|---|---|---|---|---|---|
| 5,931,138 | A | * | 8/1999 | Uchida | ........................ | 123/436 |
| 6,055,948 | A | * | 5/2000 | Shiraishi et al. | .......... | 123/90.15 |
| 6,192,857 | B1 | * | 2/2001 | Shimada | ..................... | 123/322 |
| 6,276,316 | B1 | * | 8/2001 | Arai et al. | ................ | 123/90.11 |
| 6,369,531 | B1 | * | 4/2002 | Oshima et al. | .............. | 318/139 |
| 6,371,065 | B1 | * | 4/2002 | Shiraishi et al. | .......... | 123/90.15 |
| 6,401,684 | B2 | * | 6/2002 | Hori et al. | ................ | 123/198 F |
| 2002/0078911 | A1 | * | 6/2002 | Morikami | ................ | 123/90.11 |
| 2002/0129785 | A1 | * | 9/2002 | Tetsuno et al. | .............. | 123/295 |
| 2002/0148422 | A1 | * | 10/2002 | Shiraishi et al. | .......... | 123/90.15 |

FOREIGN PATENT DOCUMENTS

JP       2000-204987       7/2000

* cited by examiner

*Primary Examiner*—Nicholas Ponomarenko
(74) *Attorney, Agent, or Firm*—Dickstein Shapiro Morin & Oshinsky LLP

(57) ABSTRACT

The present invention provides a hybrid motor comprising an engine comprising a plurality of intake valves and an auxiliary power plant in communication with the engine and a throttle valve for controlling a quantity of air into the engine wherein during operation by the auxiliary power plant the throttle valve is open and the intake valves are opened by the valve control unit.

81 Claims, 7 Drawing Sheets

HYBRID MOTOR FOR A VEHICLE

FIELD OF THE INVENTION

The present invention relates to a hybrid motor for a vehicle, and particularly, to a hybrid motor for a vehicle comprising an engine and an auxiliary power plant with greater efficiency.

DISCUSSION OF THE RELATED ART

Conventionally, in a hybrid motor comprising an engine and an auxiliary power plant, for example, an electric rotary machine, a great amount of pressure is generated within the engine during operation of the auxiliary power plant. For example, when the auxiliary power plant is operating, the engine does not function normally, for example, as a four stroke cycle engine. In other words, the operation of the motor is performed by the auxiliary power plant and not the engine. Consequently, the opening and closing of the valves of the engine is not performed causing undue pressure within the engine since, typically, the engine's crankshaft is directly connected to the auxiliary power plant. In other words, the pistons within the cylinder are in constant motion and build up pressure within the engine. Hence, more power is wasted by the auxiliary power plant to overcome this pressure. Consequently, efficiency is reduced and the operational cost of the hybrid motor is increased.

SUMMARY OF THE INVENTION

The present invention provides a hybrid motor for a vehicle comprising an engine and an auxiliary power plant having greater efficiency.

In an object of the present invention a hybrid motor is provided comprising an engine comprising a plurality of intake valves for primary operation as the motor, an auxiliary power plant in communication with the engine for secondary operation as the motor and a throttle valve for controlling a quantity of air into the engine. Further, the present invention provides an intake valve control unit for controlling the opening and closing of the intake valves wherein during the secondary operation by the auxiliary power plant the throttle valve is open and the intake valves are opened by the intake valve control unit.

In another object of the present invention a hybrid motor is provided comprising an engine comprising a plurality of intake valves for primary operation as the motor and an auxiliary power plant in communication with the engine for secondary operation as the motor. The invention further provides a throttle valve for controlling a quantity of air into the engine wherein during the secondary operation by the auxiliary power plant the intake valves and the throttle valve are opened.

In yet another object of the present invention a hybrid motor is provided comprising an engine comprising a plurality of intake valves and an auxiliary power plant in communication with the engine and a throttle valve for controlling a quantity of air into the engine wherein during operation by the auxiliary power plant the throttle valve is open and the intake valves are opened by the valve control unit.

In yet another objects of the present invention a motor vehicle comprising the hybrid motor of the present invention is provided as well as a method for fabricating the hybrid motor.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
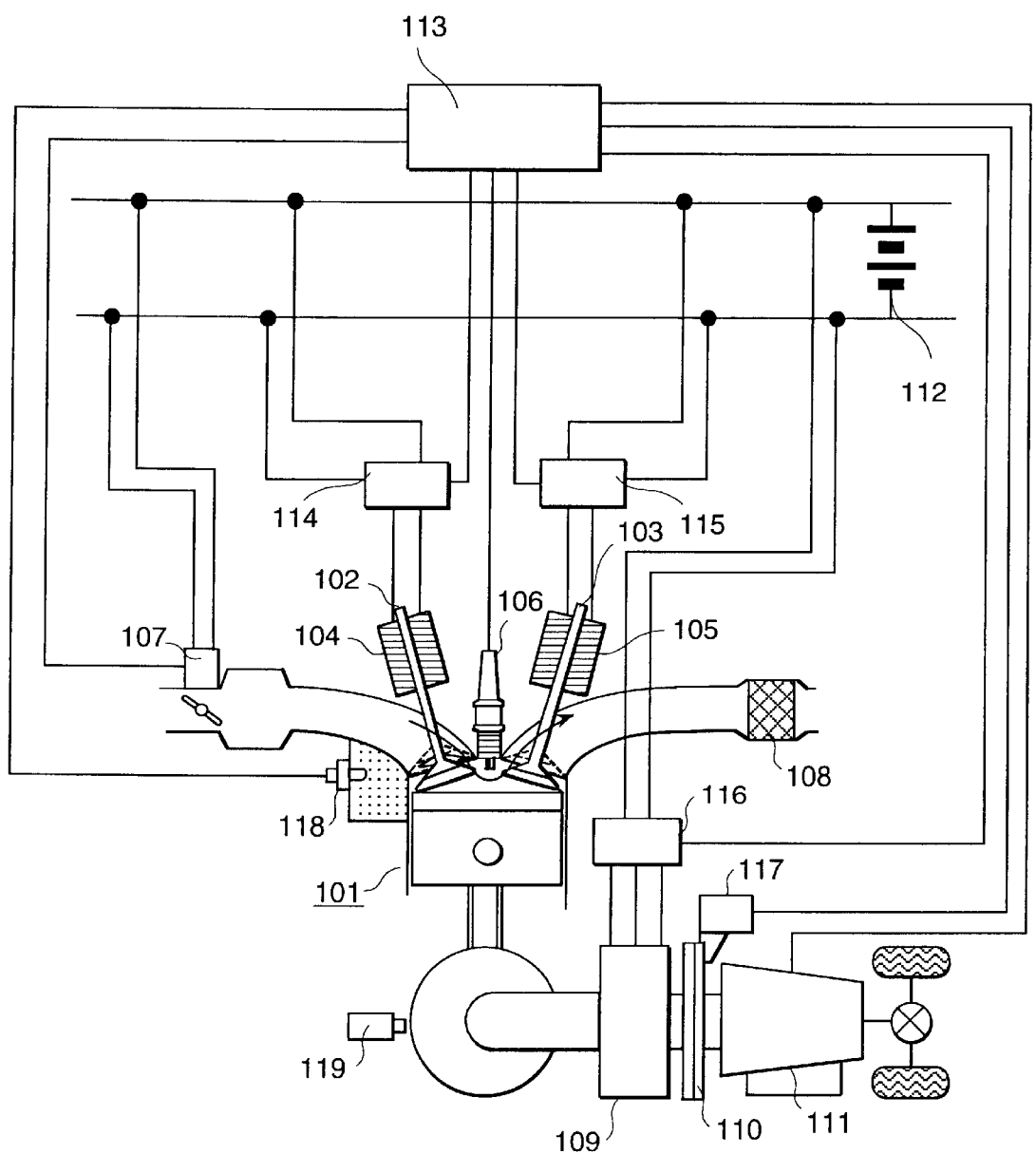
FIG. 1 illustrates an embodiment of a hybrid motor of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to FIG. 1, an engine 101, which is one of the driving sources of a motor for a vehicle, has an intake valve 102 and an exhaust valve 103, which are driven by valve actuators 104, 105, respectively. In this embodiment, the valve control units 104, 105 are electromagnetic valves. An ignition plug 106 is provided to ignite a mixture. An electronically controlled throttle valve 107 is a device for controlling an intake air quantity to the engine 101. A catalyst 108 is a device for purifying injurious substances in the exhaust.

An auxiliary power plant 109, which is another driving source of a motor for the vehicle, can be an electric rotary machine. The auxiliary power plant 109 can also be used for starting the engine 101. A clutch 110 is a device for transmitting or interrupting a driving force of the engine 101 and the power plant 109 to a transmission 111. A battery 112 is provided to supply power to a power load of the vehicle, or to store power generated by the power plant 109.

A hybrid motor control device 113 controls the driving force of the vehicle and the exhaust characteristic of the engine 101, and charge/discharge of the battery 112. Therefore, the device 113 controls the timing of the opening and closing of the intake and exhaust valves 102, 103, an opening of the electronically controlled throttle valve 107, ignition timing, engagement and disengagement of the clutch 110, speed change timing, and the driving force of the power plant 109.

Valve drive and control devices 114 and 115 are devices for supplying drive power to the intake and exhaust valve actuators 104, 105, and an auxiliary power plant drive and control device 116 is a device for supplying drive power to the power plant 109. Generally, an inverter is used for these control devices. A clutch actuator 117 is a device for controlling the engagement and disengagement of the clutch 110. A water temperature sensor 118 is a sensor for detecting the temperature of cooling water flowing along the outer periphery of a block of the engine 101. An engine speed sensor 119 is a device for detecting the speed of an output shaft of the engine 101.

In the present invention, the engine 101 is directly connected to the power plant 109 to make the system compact. Similarly, damping control of the engine 101 by the power plant 109 can be easily accomplished because of the direct connection. Further, since the clutch 110 is disposed between the power plant 109 and the transmission 111, the speed control of the engine 101 during changing speed is easily accomplished. Here, automatic MT by which clutch operation and gear selecting operation of a manual transmission (MT) which has high transmission efficiency is envisioned, but an automatic transmission (AT) and a continuously variable transmission (CVT) may also be applied.

In the present invention, the power plant 109 runs the motor in association with the engine 101. The engine performs as the primary operator of the motor and the power plant 109 performs as a secondary operator. In the conventional system, an extremely great torque was necessary for cooperating with the engine. In the present system, the intake valve 102 is opened to a position not interfered with a piston head, the exhaust valve 103 is fully closed, and the electronically controlled throttle valve is fully opened to eliminate the compression work of the engine. Further, by the employment of the electromagnetic valve, a drive torque of a camshaft is also unnecessary. Therefore, loads of the engine with respect to the power plant 104 are inertia and friction between the piston and the crank shaft. If running by the motor is attempted to be carried out after a temperature of the wall surface of a cylinder of the engine 101 has sufficiently risen, viscosity of oil is low, and lubrication is sufficient.

In a case where the intake valve control unit 104 stops power supplying, a valve assumes a neutral state, design is made such that the neutral position is a position not interfered with the piston head to thereby enable reduction in consuming power at the time of running by the auxiliary power plant 109. In other words, during the secondary operation by the auxiliary power plant, both the throttle valve is open and the intake valves are opened by the intake valve control unit. Also, the exhaust valve 103 is closed, whereby fresh air does not pass through the catalyst 108 during running by the power plant 109 to suppress lowering of temperature of the catalyst 108. Further, in a case where the engine is started from a condition of running by the power plant 109, air is traveling within the intake pipe, and therefore, fuel is injected into a cylinder while the piston rises, and the timing of the closing of the intake valve 102 is controlled so as to enable absorption of torque variation in the first combustion to start the engine 101.

Figure 2:
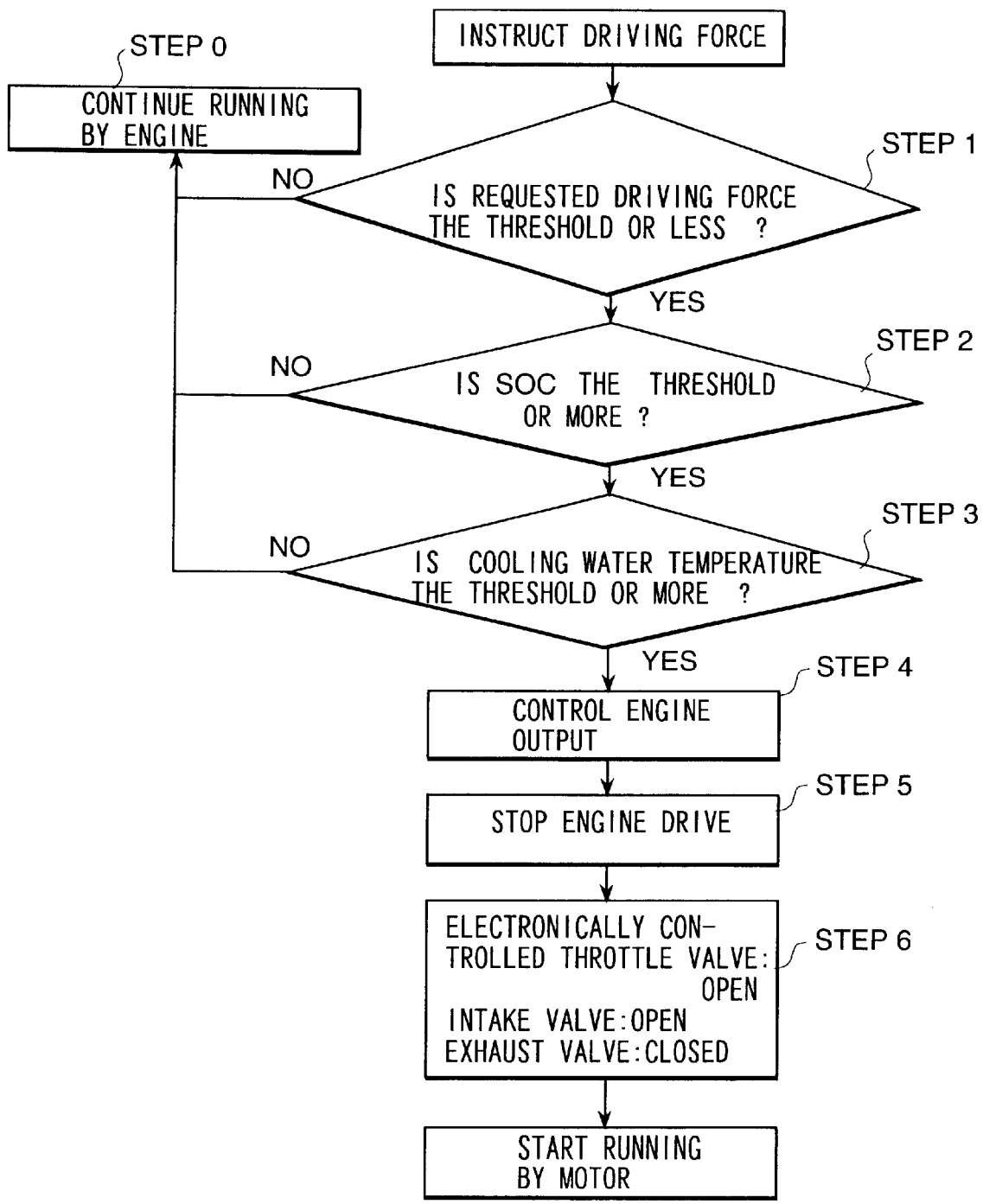
FIG. 2 illustrates the decision making procedure of running by the motor in an embodiment of the present invention.
Figure 4:
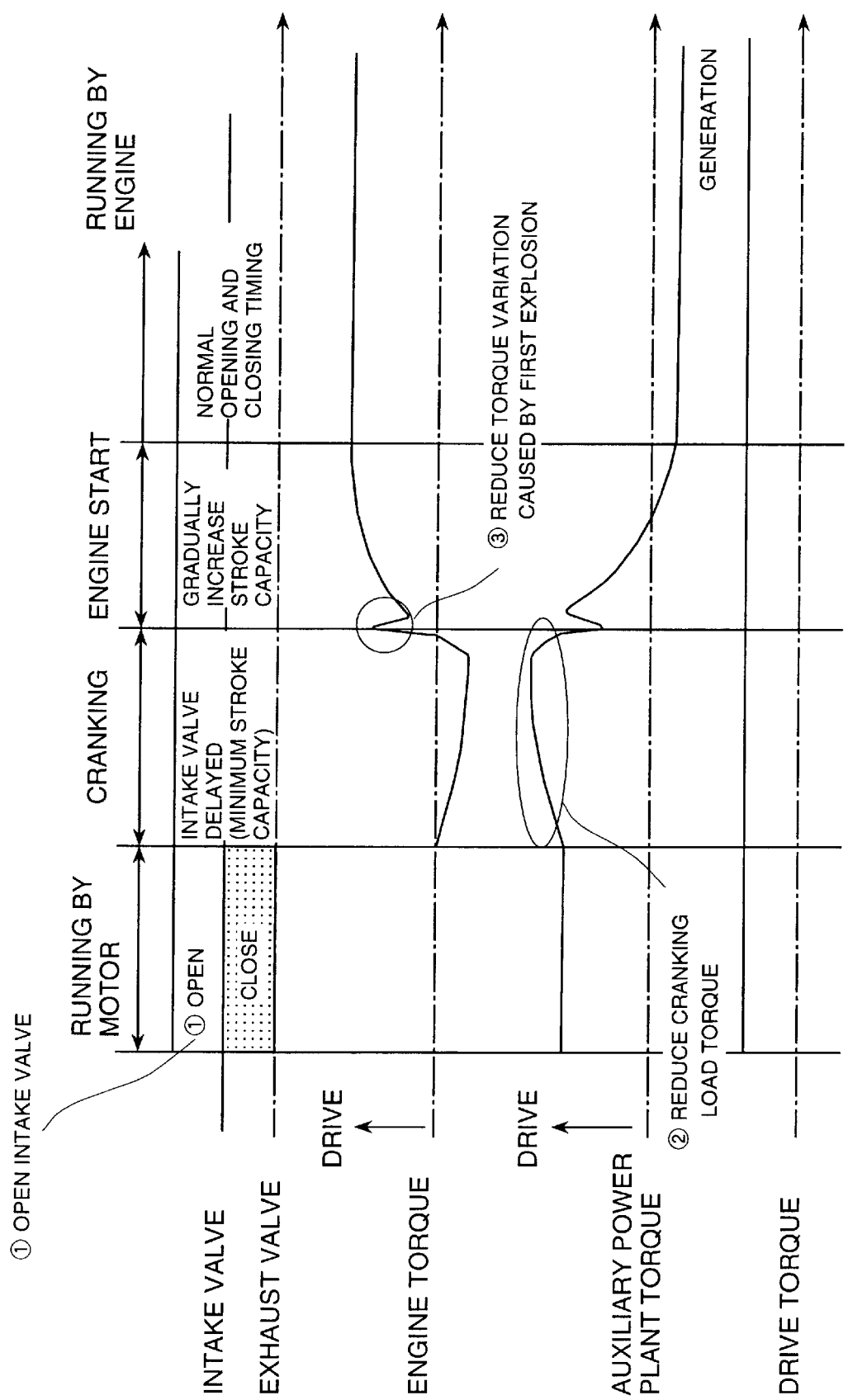
FIG. 4 illustrates an embodiment of an operation of the control system shown FIG. 1.

Referring now to FIG. 2, a flowchart of engine stop in the hybrid motor according to the present invention is shown. In a case where a driver desires a small driving force, the engine 101 is stopped from a viewpoint of fuel consumption, and running by a power plant 109 takes place (a running mode by a power plant 109 in FIG. 4). In Step 1, decision is made as to whether a driving force can be generated by the power plant 109. If a requested driving force is equal to or lower than a threshold obtained by subtracting the inertia of the system, cranking torque of the engine 101 or the like from the driving force able to be generated by the power plant 109, the procedure moves to Step 2. The driving force threshold is given in advance by a map or the like. If the requested driving force is the threshold or more, running by the engine 101 is continued.

In Step 2, decision is made of a charge state of a battery. If SOC is equal to or higher than a threshold at which running by the power plant 109 is possible, the procedure moves to Step 3. If SOC is low, the engine torque is increased while continuing running by the engine 101, and the surplus torque is fed by the auxiliary power plant 109 whereby the driver may charge the battery. In other words, an auxiliary power detector (or battery 112) is provided for preventing operation by the auxiliary power plant 109 when the auxiliary power is equal or below a threshold power. In this embodiment, the threshold power is about 30 volts.

In Step 3, decision is made of the state of the engine. If the cooling water temperature of the engine 101 is low, the viscosity of lubricating oil is high and the friction is also great. Therefore, the loss in cooperation is great and the cranking torque at the time of restart is also great. In this case, running by the motor is prohibited. While the cooling water temperature is detected, an oil temperature or the like may be used instead. If the cooling water temperature is equal to or lower than a threshold, the engine torque is increased while continuing running by the engine, and the surplus torque is fed by the power plant 109 whereby the cooling water temperature may be increased. Another reason for the higher temperatures is to maintain the functionality of the catalyst 108. Hence, a temperature detecting means (sensor 118) is provided for preventing the operation by the power plant 109 if a temperature in the engine is equal or below a threshold temperature. In the present invention, the threshold temperature is about 230° C.

In Step 4, the output of the engine 101 is reduced until the inertia of the engine 101 can be absorbed by power plant 109.

In Step 5, the drive of the engine 101 is stopped. At this time, the driving force of the vehicle is generated by the power plant 109. Since the power plant 109 and the engine 101 are connected directly to each other, the engine 101 cooperates with the speed of the power plant 109.

In Step 6, resistance of the engine 101 is reduced, and the intake valve 102 of the engine 101 is opened so as to relieve pressure generated by the positions in the engine 101. Also, the exhaust valve 103 is closed to keep the catalyst 108 warm and functional.

Figure 3:
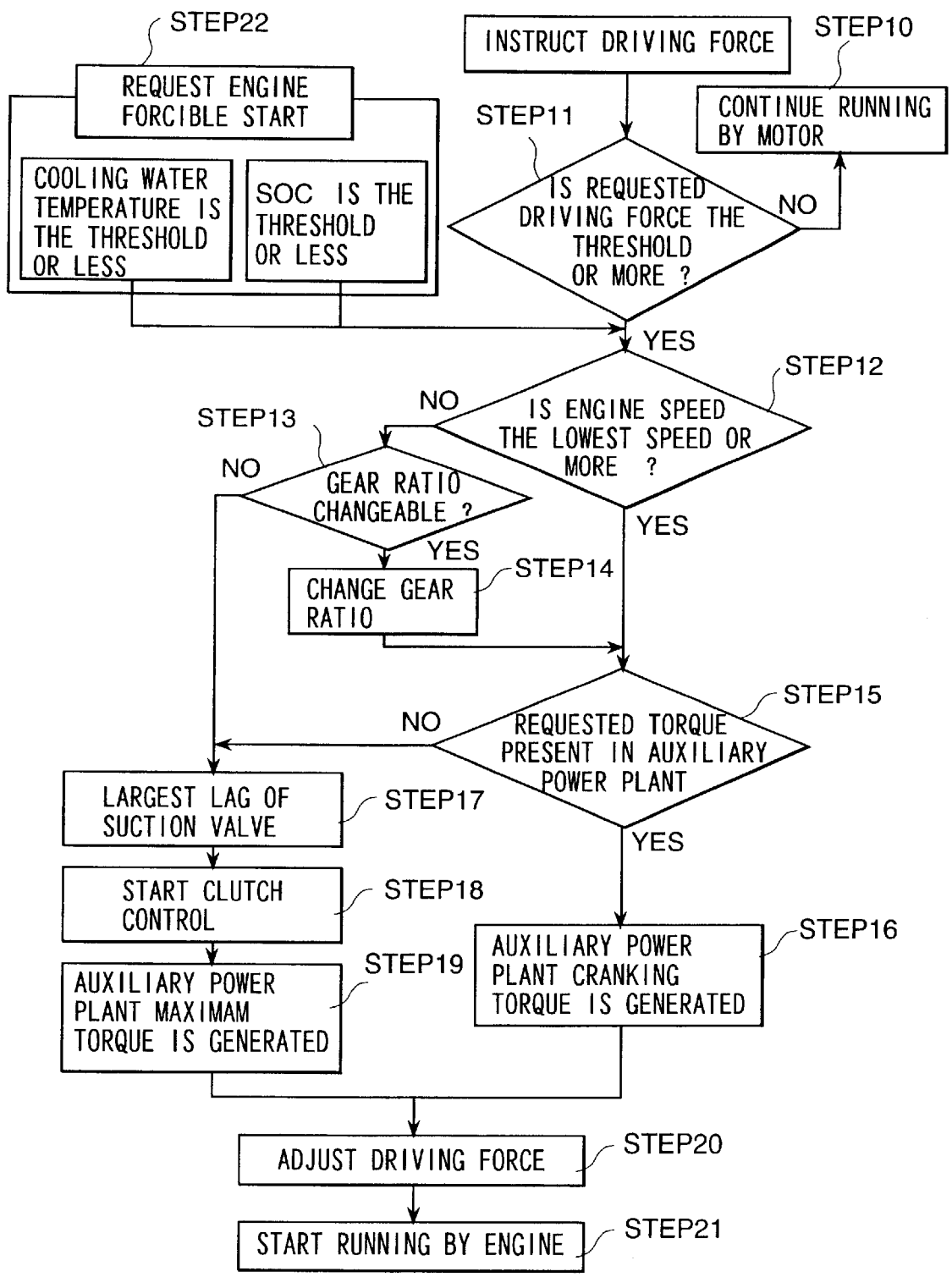
FIG. 3 illustrates the decision making procedure of cranking and engine starting in an embodiment of the present invention.

FIG. 3 is a flowchart of the engine starting (the cranking and engine start mode in FIG. 4) of the hybrid motor according to the present invention. When a driver issues an instruction for a great driving force, the power plant 109 cannot handle such power. So, the engine 101 is started. In Step 11, decision is made as to whether the driving force can be generated by the power plant 109. If the requested driving force is the threshold or more, the procedure moves to Step 12. The driving force threshold is given in advance by the map or the like. If the requested driving force is equal to or lower than the threshold, the procedure moves to Step 10, and running by the motor is continued.

In Step 12, decision is made as to whether the engine speed is the lowest engine speed or more. If the engine speed is equal to or lower than the lowest engine speed, the procedure moves to Step 13.

In Step 13, decision is made as to whether shift-down is done and the speed of the engine can be increased. If the shift-down is enabled, the procedure moves to Step 14, where the gear is switched.

When the engine speed is the lowest engine speed or more, the procedure moves to Step 15. In Step 15, decision is made as to whether the auxiliary power plant has enough torque to crank the engine 101. If the auxiliary power plant has the required torque, the procedure moves to Step 16, where the auxiliary power plant generates the cranking torque to start the engine 101 (the cranking mode in FIG. 4).

In a case where the engine speed is equal to or lower than the lowest speed, or where the auxiliary power plant has no torque as required, the procedure moves to Step 17. At this time, in a case where the engine speed is equal to or lower than the lowest engine speed, the vehicle runs while slipping the clutch. In Step 17, the intake valve 102 is made to have a largest lag so that the cranking torque of the engine is minimum.

Next, the procedure moves to Steps 18 and 19. In a case where the engine speed is equal to or lower than the lowest speed, the torque of the power plant 109 is increased while slipping the clutch to raise the speed of the engine (the engine start mode in FIG. 4). In a case where the auxiliary power plant has no torque as required, the vehicle driving force is lowered while gradually slipping the clutch so that the greater cranking torque of the power plant 109 may be transmitted to the engine. In other words, a clutch is in communication with a transmission for controlling a start of the engine 101 from the power plant 109 when a speed of the engine is equal or below a threshold speed. In the present invention, the threshold speed is about 600 rpm.

In step 22, a request for forcibly starting an engine is shown. When the cooling water temperature lowers, the friction of the engine increases, thus lowering the efficiency of running by the motor. Further, when SOC of the battery lowers, it is difficult to continue running by the motor. So, in a case where the cooling water temperature and SOC are equal to or lower than the threshold, a request is issued to start the engine forcibly.

Figure 5:
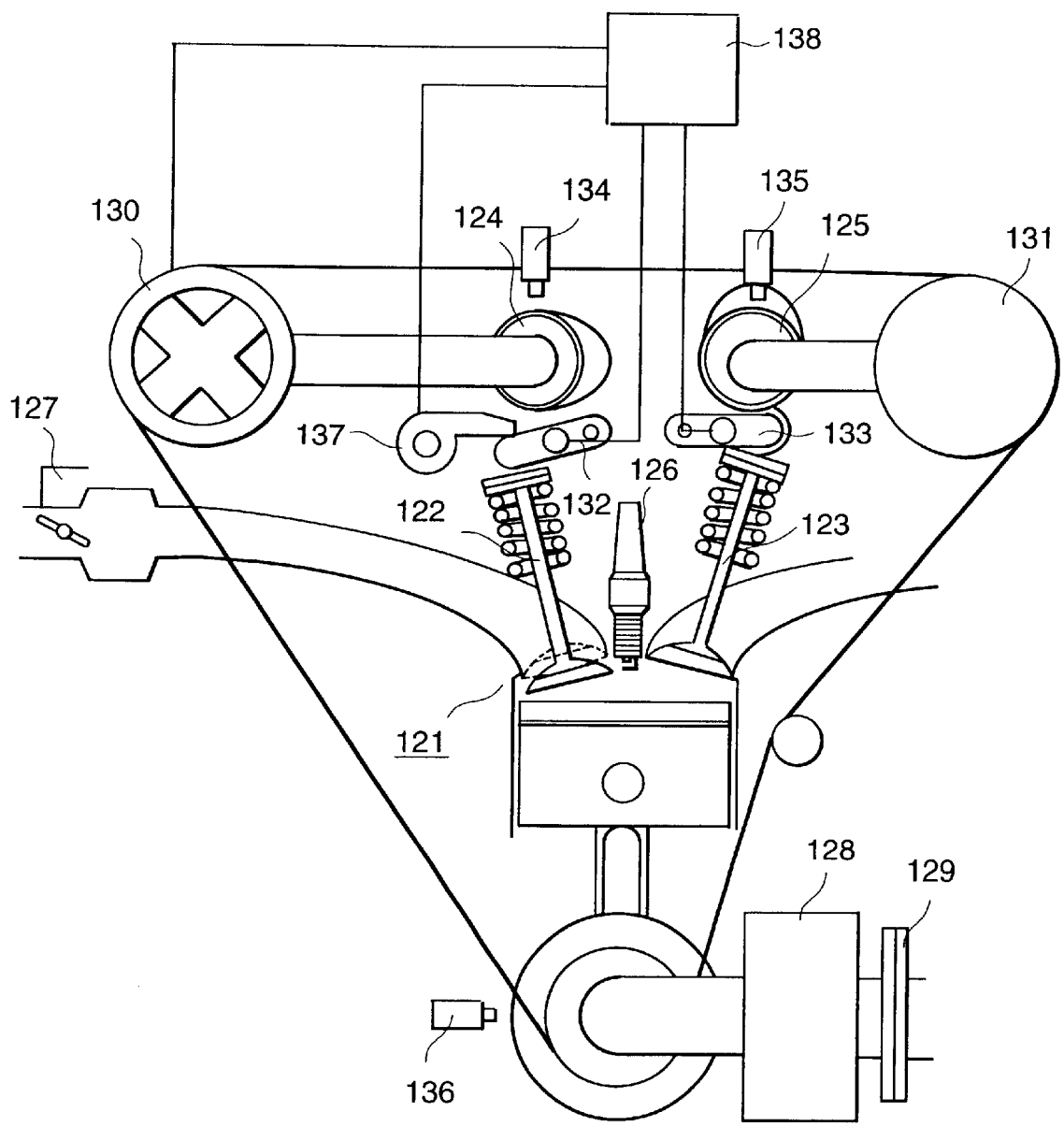
FIG. 5 illustrates another embodiment of the hybrid motor according to the present invention.

FIG. 5 illustrates an engine 121 having an intake valve 122 and an exhaust valve 123, which are driven by cams 124 and 125, respectively. The cams 124 and 125 obtain power from the engine 121. An ignition plug 126 is provided to ignite a mixture. An electronically controlled throttle valve 127 is a device for controlling an intake air quantity to the engine 121.

A power plant 128 is an electric motor for carrying out driving, power generation and starting of the engine 121. A clutch 110 is a device for transmitting or interrupting driving forces of the engine 101 and the auxiliary power plant 109 to a drive shaft. A VVT device 130 is connected to the cam 124 and an output shaft of the engine 121 so that a phase of the cam 124 is changed steplessly according to the operating conditions of the engine 121 to change the opening and closing timing of the intake valve 122. A camshaft pulley 131 is connected to the cam 125. A rocker arm 132 transmits a driving force of the cam 124 to the intake valve 122. A rocker arm 133 transmits a driving force of the cam 125 to the exhaust valve 123. Camshaft phase detection devices 134 and 135 detect phases of shafts of cams 124 and 125, respectively. An engine speed detection device 136 detects the speed of an engine output shaft and information of a piston position for each cylinder. An intake valve lift device 137 is a mechanism for allowing the intake valve 122 to be held with a predetermined lift mount. An oil pressure supply device 138 supplies oil pressure to each actuator.

In this embodiment, when the vehicle runs by a driving force produced by the power plant 128, fixed pins on the rocker arms 132 and 133 are removed to place both the intake and exhaust valves 122 and 123 in suspension. Thus, the driving force of the cams 124 and 125 are not transmitted to the intake and exhaust valves 122 and 123, and the intake and exhaust valves 122 and 123 are placed in a closed state by means of a spring. Next, the intake valve lift device 137 is actuated to lift the intake valve 122 to a position not interfered with the piston. Since the cams 124 and 125 are free, the driving force for pushing the intake and exhaust valves 122 and 123 can be reduced. Since the intake valve 122 assumes an open state, the engine 121 will not create undue pressure. Accordingly, the power plant 128 has small torque for cooperating with the engine 121, enabling the motor running with less loss.

Conversely, in a case where the engine is started from a state of running by the motor, fuel is injected to the cylinder along which the piston is moving up, the fixed pin of the rocker arm of the cylinder is positioned in place, the VVT device 130 is controlled so that the torque variation caused by the first combustion is reduced, and the close timing of the intake valve 122 is changed to start the engine. Since the engine is started from a state in which the piston is moving, the vibration caused by variation of inertia is small, which can be controlled by the power plant 128. Since the phase information of the camshaft can be detected by the cam phase detection devices 134 and 135, it is possible to grasp the fastening timing of the fixed pin of the rocker arm, and the release timing of the intake valve lift device.

Figure 6:
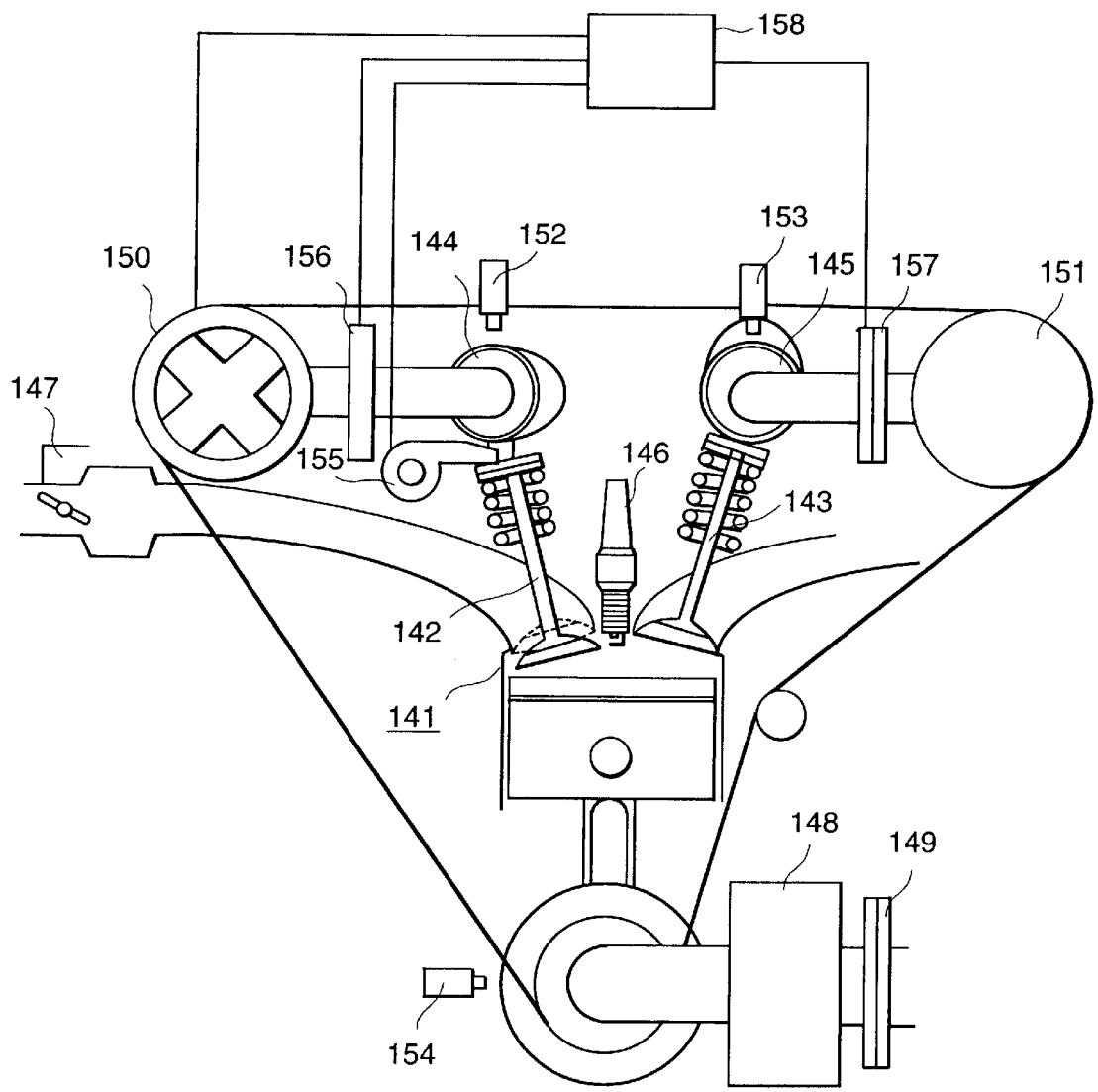
FIG. 6 illustrates another embodiment of the hybrid motor according to the present invention.

FIG. 6 illustrates an engine 141 having an intake valve 142 and an exhaust valve 143, which are driven by cams 144 and 145, respectively. The cams 144 and 145 obtain power from the engine 141. An ignition plug 146 is provided to ignite a mixture. An electronically controlled throttle valve 147 is a device for controlling an intake air quantity to the engine 141. A power plant 148 is an electric motor for carrying out driving, power generation and starting of the engine 141. A clutch 110 is a device for transmitting or interrupting driving forces of the engine 101 and the auxiliary power plant 109 to a drive shaft. A VVT device 150 is connected to the cam 144 and an output shaft of the engine 141 so that a phase of the cam 144 is changed steplessly according to the operating conditions of the engine 141 to change the timing of the opening and closing of the intake valve 142. A camshaft pulley 151 is connected to the cam 145. Camshaft phase detection devices 152 and 153 detect phases of the cams 144 and 145, respectively. An engine speed detection device 154 detects the speed of an engine output shaft and information of a piston position for each cylinder. An intake valve lift device 155 is a mechanism for allowing the intake valve 142 to be held with a predetermined lift amount. Camshaft clutches 156 and 157 are devices for releasing or fastening the camshaft and the engine drive shaft. An oil pressure supply device 158 supplies oil pressure to each actuator.

In this embodiment, when the vehicle runs by a driving force produced by the power plant 148, the camshaft clutches 157 and 156 are disengaged. Accordingly, the rotation of the engine 141 is not transmitted to the camshaft. Therefore, the intake and exhaust valves 142 and 143 are placed in a closed state by means of a spring. Next, the intake valve lift device 155 is actuated to lift the intake valve 142 to a position not interfered with the piston. Since the camshaft clutches 156 and 157 are in a disengaged state, the cams 144 and 145 are free, and the driving force for pushing the intake and exhaust valves 142 and 143 can be reduced since the intake valve 142 assumes an open state. The engine 141 will not create undue pressure, resulting in the efficient operation of the engine 141. Accordingly, the power plant 148 is small in torque for cooperating with the engine 141, enabling running by the motor with less loss.

Conversely, in a case where the engine is started from a state of running by the power plant 148, fuel is injected to the cylinder along which the piston is moving up, the intake valve lift device 155 is released, and the fastening state of the camshaft clutches 156 and 157 are controlled while detecting phase information of the cam by the cam phase detection devices 134 and 135 to align the phases of the cams 144 and 145 with the phase of the engine 141. Further, the VVT device 150 is controlled so that the torque variation caused by the first combustion is reduced, and the close timing of the intake valve 142 is changed to start the engine. Since the engine is started from the state in which the piston is moving, the vibration caused by variation of inertia is small, which can be controlled by the auxiliary power plant 148. Since the phase information of the camshaft can be detected by the cam phase detection devices 152 and 153, it is possible to grasp the fastening timing of the camshaft clutches 156 and 157. Further, by controlling the fastening state of the camshaft clutches 156 and 157, it is possible to realize the opening and closing timing in a wider range than the movable range of the VVT device 150.

Figure 7:
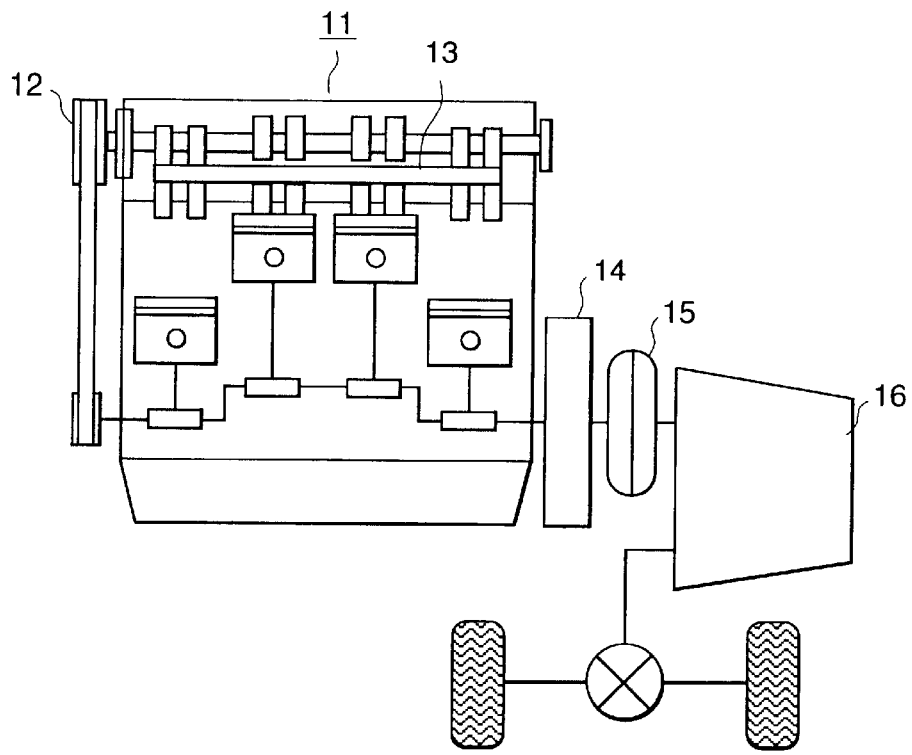
FIG. 7 illustrates another embodiment of the hybrid motor according to the present invention.

FIG. 7 illustrates an engine 11 having a variable valve mechanism 12. An intake and exhaust valve suspension mechanism 13 can stop an intake and an exhaust valve and lift the intake valve to a predetermined position. A auxiliary power plant 14 is connected to an output shaft of the engine 11. A torque converter 15 has a function to amplify torque of the engine 11 and the auxiliary power plant 14 is provided with a lock-up clutch device capable of being directly connected. An automatic transmission 16 is a transmission for automatic speed change by oil pressure. Running by the power plant is carried out by actuating the intake and exhaust valve suspension mechanism 13 to reduce the load with respect to the auxiliary power plant 14 of the engine 11.

Conventionally, it has been necessary to provide a clutch between the engine 11 and the auxiliary power plant 14. In the present invention, the auxiliary power plant 14 is merely added to the existing AT vehicle. Since the clutch need not be newly provided, the loading property on a vehicle is excellent. Further, since an actuator of a clutch is also unnecessary, the cost is low.

Figure 8:
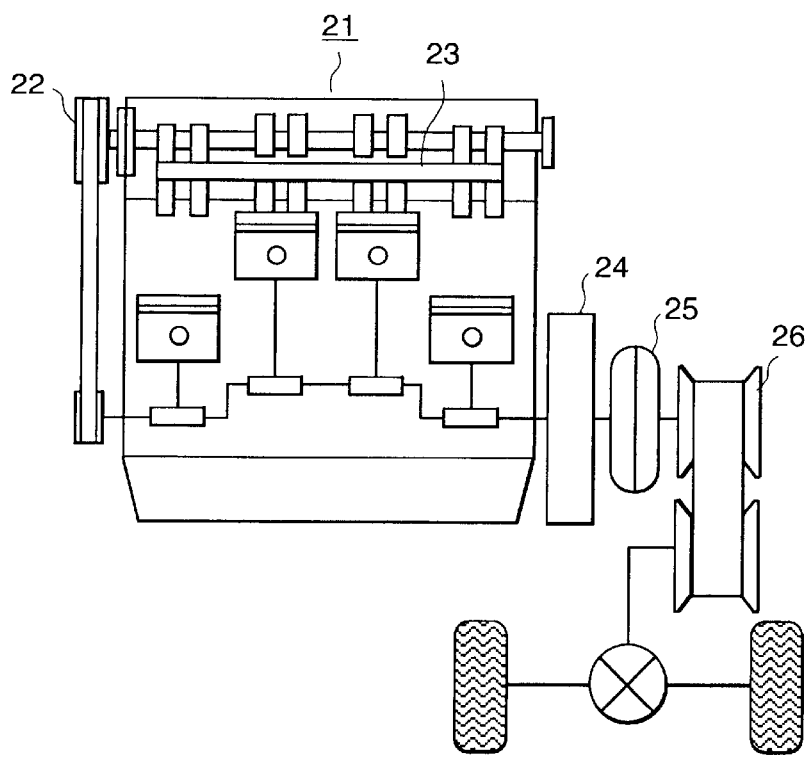
FIG. 8 illustrates still another embodiment of the hybrid motor according to the present invention.

FIG. 8 illustrates an engine 21 having a variable valve mechanism 22. An intake and exhaust valve suspension mechanism 23 can stop an intake and an exhaust valve and lift the intake valve to a predetermined position. An auxiliary power plant 24 is connected to an output shaft of the engine 21. A torque converter 25 has a function to amplify torque of the engine 21 and the auxiliary power plant 24 and is provided with a lock-up clutch capable being directly connected. A continuously variable transmission (CVT) 26 is a transmission for changing a speed-change ratio in a non-step manner. Running by the power plant is carried out by actuating the intake and exhaust valve suspension mechanism 23 to reduce the load with respect to the auxiliary power plant 24 of the engine 21.

Conventionally, it has been necessary to provide a clutch between the engine 21 and the auxiliary power plant 24. In the present invention, the auxiliary power plant 24 is merely added to the existing automatic transmission vehicle. Since the clutch need not be newly provided, the vehicle loading property is excellent. Further, since a clutch actuator is also unnecessary, the cost is low.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A hybrid motor comprising:
    an engine comprising a plurality of intake valves for primary operation as said motor;
    an auxiliary power plant in communication with said engine for secondary operation as said motor;
    a throttle valve for controlling a quantity of air into said engine;
    an intake valve control unit for controlling the opening and closing of said intake valves; and
    wherein during said secondary operation by said auxiliary power plant said throttle valve is open and said intake valves are opened by said intake valve control unit.

2. The motor of claim 1 wherein said intake valve control unit is electromagnetic.

3. The motor of claim 1 wherein said auxiliary power plant is an electric rotary machine.

4. The motor of claim 1 further comprising a temperature detecting means for preventing said secondary operation if a temperature in said engine is equal or below a threshold temperature.

5. The motor of claim 4 wherein said threshold temperature is about 230° C.

6. The motor of claim 1 further comprising an auxiliary power detector for said auxiliary power plant for preventing said secondary operation when an auxiliary power is equal or below a threshold power.

7. The motor of claim 6 wherein said threshold power is about 30 volts.

8. The motor of claim 1 further comprising a clutch in communication with a transmission for controlling a start of said primary operation from said secondary operation when a speed of said engine is equal or below a threshold speed.

9. The motor of claim 8 wherein said threshold speed is about 600 rpm.

10. A hybrid motor comprising:
    an engine comprising a plurality of intake valves for primary operation as said motor;
    an auxiliary power plant in communication with said engine for secondary operation as said motor;
    a throttle valve for controlling a quantity of air into said engine; and
    wherein during said secondary operation by said auxiliary power plant said intake valves and said throttle valve are opened.

11. The motor of claim 10 further comprising an electromagnetic intake valve control unit for controlling an opening and closing of said intake valves.

12. The motor of claim 10 wherein said auxiliary power plant is an electric rotary machine.

13. The motor of claim 10 further comprising a temperature detecting means for preventing said secondary operation if a temperature in said engine is equal or below a threshold temperature.

14. The motor of claim 13 wherein said threshold temperature is about 230° C.

15. The motor of claim 10 further comprising an auxiliary power detector for said auxiliary power plant for preventing said secondary operation when an auxiliary power is equal or below a threshold power.

16. The motor of claim 15 wherein said threshold power is about 30 volts.

17. The motor of claim 10 further comprising a clutch in communication with a transmission for controlling a start of said primary operation from said secondary operation when a speed of said engine is equal or below a threshold speed.

18. The motor of claim 17 wherein said threshold speed is about 600 rpm.

19. A hybrid motor comprising:
an engine comprising a plurality of intake valves and an auxiliary power plant in communication with said engine and a throttle valve for controlling a quantity of air into said engine wherein during operation by said auxiliary power plant said throttle valve is open and said intake valves are opened by said valve control unit.

20. The motor of claim 19 further comprising an electromagnetic intake valve control for controlling the opening and closing of said intake valve.

21. The motor of claim 19 wherein said auxiliary power plant is an electric rotary machine.

22. The motor of claim 19 further comprising a temperature detecting means for preventing operation by said auxiliary power plant if a temperature in said engine is equal or below a threshold temperature.

23. The motor of claim 22 wherein said threshold temperature is about 230° C.

24. The motor of claim 19 further comprising an auxiliary power detector for preventing operation by said auxiliary power plant when an auxiliary power is equal or below a threshold power.

25. The motor of claim 24 wherein said threshold power is about 30 volts.

26. The motor of claim 19 further comprising a clutch in communication with a transmission for controlling a start of said engine from said auxiliary power plant when a speed of said engine is equal or below a threshold speed.

27. The motor of claim 26 wherein said threshold speed is about 600 rpm.

28. A motor vehicle comprising:
a hybrid motor comprising:
an engine comprising a plurality of intake valves for primary operation as said motor;
an auxiliary power plant in communication with said engine for secondary operation as said motor;
a throttle valve for controlling a quantity of air into said engine;
an intake valve control unit for controlling the opening and closing of said intake valves; and
wherein during said secondary operation by said auxiliary power plant said throttle valve is open and said intake valves are opened by said valve control unit.

29. The vehicle of claim 28 wherein said intake valve control unit is electromagnetic.

30. The vehicle of claim 28 wherein said auxiliary power plant is an electric rotary machine.

31. The vehicle of claim 28 further comprising a temperature detecting means for preventing said secondary operation if a temperature in said engine is equal or below a threshold temperature.

32. The vehicle of claim 31 wherein said threshold temperature is about 230° C.

33. The vehicle of claim 28 further comprising an auxiliary power detector for said auxiliary power plant for preventing said secondary operation when an auxiliary power is equal or below a threshold power.

34. The vehicle of claim 33 wherein said threshold power is about 30 volts.

35. The vehicle of claim 28 further comprising a clutch in communication with a transmission for controlling a start of said primary operation from said secondary operation when a speed of said engine is equal or below a threshold speed.

36. The vehicle of claim 35 wherein said threshold speed is about 600 rpm.

37. A motor vehicle comprising:
a hybrid engine comprising:
an engine comprising a plurality of intake valves for primary operation as said motor;
an auxiliary power plant in communication with said engine for secondary operation as said motor;
a throttle valve for controlling a quantity of air into said engine; and
wherein during said secondary operation by said auxiliary power plant said intake valves and said throttle valve are opened.

38. The vehicle of claim 37 further comprising an electromagnetic intake valve control unit for controlling an opening and closing of said intake valves.

39. The vehicle of claim 37 wherein said auxiliary power plant is an electric rotary machine.

40. The vehicle of claim 37 further comprising a temperature detecting means for preventing said secondary operation if a temperature in said engine is equal or below a threshold temperature.

41. The vehicle of claim 40 wherein said threshold temperature is about 230° C.

42. The vehicle of claim 37 further comprising an auxiliary power detector for said auxiliary power plant for preventing said secondary operation when an auxiliary power is equal or below a threshold power.

43. The vehicle of claim 42 wherein said threshold power is about 30 volts.

44. The vehicle of claim 37 further comprising a clutch in communication with a transmission for controlling a start of said primary operation from said secondary operation when a speed of said engine is equal or below a threshold speed.

45. The vehicle of claim 44 wherein said threshold speed is about 600 rpm.

46. A motor vehicle comprising:
a hybrid motor comprising:
an engine comprising a plurality of intake valves and an auxiliary power plant in communication with said engine and a throttle valve for controlling a quantity of air into said engine wherein during operation by said auxiliary power plant said throttle valve is open and said intake valves are opened by said valve control unit.

47. The vehicle of claim 46 further comprising an electromagnetic intake valve control for controlling the opening and closing of said intake valve.

48. The vehicle of claim 46 wherein said auxiliary power plant is an electric rotary machine.

49. The vehicle of claim 46 further comprising a temperature detecting means for preventing operation by said auxiliary power plant if a temperature in said engine is equal or below a threshold temperature.

50. The vehicle of claim 49 wherein said threshold temperature is about 230° C.

51. The vehicle of claim 46 further comprising an auxiliary power detector for preventing operation by said auxiliary power plant when an auxiliary power is equal or below a threshold power.

52. The vehicle of claim 51 wherein said threshold power is about 30 volts.

53. The vehicle of claim 46 further comprising a clutch in communication with a transmission for controlling a start of said engine from said auxiliary power plant when a speed of said engine is equal or below a threshold speed.

54. The vehicle of claim 53 wherein said threshold speed is about 600 rpm.

55. A method of fabricating a hybrid motor comprising the steps of:

providing an engine comprising a plurality of intake valves for primary operation as said motor;

providing an auxiliary power plant in communication with said engine for secondary operation as said motor;

providing a throttle valve for controlling a quantity of air into said engine;

providing an intake valve control unit for controlling the opening and closing of said intake valves; and wherein during said secondary operation by said auxiliary power plant said throttle valve is open and said intake valves are opened by said valve control unit.

56. The method of claim 55 wherein said intake valve control unit is electromagnetic.

57. The method of claim 55 wherein said auxiliary power plant is an electric rotary machine.

58. The method of claim 55 further comprising the step of providing a temperature detecting means for preventing said secondary operation if a temperature in said engine is equal or below a threshold temperature.

59. The method of claim 58 wherein said threshold temperature is about 230° C.

60. The method of claim 55 further comprising the step of providing an auxiliary power detector for said auxiliary power plant for preventing said secondary operation when an auxiliary power is equal or below a threshold power.

61. The method of claim 60 wherein said threshold power is about 30 volts.

62. The method of claim 55 further comprising the step of providing a clutch in communication with a transmission for controlling a start of said primary operation from said secondary operation when a speed of said engine is equal or below a threshold speed.

63. The method of claim 62 wherein said threshold speed is about 600 rpm.

64. A method of fabricating a hybrid motor comprising the steps of:

providing an engine comprising a plurality of intake valves for primary operation as said motor;

providing an auxiliary power plant in communication with said engine for secondary operation as said motor;

providing a throttle valve for controlling a quantity of air into said engine; and wherein during said secondary operation by said auxiliary power plant said intake valves and said throttle valve are opened.

65. The method of claim 64 further comprising the step of providing an electromagnetic intake valve control unit for controlling an opening and closing of said intake valves.

66. The method of claim 64 wherein said auxiliary power plant is an electric rotary machine.

67. The method of claim 64 further comprising the step of providing a temperature detecting means for preventing said secondary operation if a temperature in said engine is equal or below a threshold temperature.

68. The method of claim 67 wherein said threshold temperature is about 230° C.

69. The method of claim 64 further comprising the step of providing an auxiliary power detector for said auxiliary power plant for preventing said secondary operation when an auxiliary power is equal or below a threshold power.

70. The method of claim 69 wherein said threshold power is about 30 volts.

71. The method of claim 64 further comprising the step of providing a clutch in communication with a transmission for controlling a start of said primary operation from said secondary operation when a speed of said engine is equal or below a threshold speed.

72. The method of claim 71 wherein said threshold speed is about 600 rpm.

73. A method of fabricating a hybrid motor comprising the steps of:

providing an engine comprising a plurality of intake valves and an auxiliary power plant in communication with said engine and a throttle valve for controlling a quantity of air into said engine wherein during operation by said auxiliary power plant said throttle valve is open and said intake valves are opened by said valve control unit.

74. The method of claim 73 further comprising the step of providing an electromagnetic intake valve control for controlling the opening and closing of said intake valve.

75. The method of claim 73 wherein said auxiliary power plant is an electric rotary machine.

76. The method of claim 73 further comprising the step of providing a temperature detecting means for preventing operation by said auxiliary power plant if a temperature in said engine is equal or below a threshold temperature.

77. The method of claim 76 wherein said threshold temperature is about 230° C.

78. The method of claim 73 further comprising the step of providing an auxiliary power detector for preventing operation by said auxiliary power plant when an auxiliary power is equal or below a threshold power.

79. The method of claim 78 wherein said threshold power is about 30 volts.

80. The method of claim 73 further comprising the step of providing a clutch in communication with a transmission for controlling a start of said engine from said auxiliary power plant when a speed of said engine is equal or below a threshold speed.

81. The method of claim 80 wherein said threshold speed is about 600 rpm.

* * * * *